March 3, 1936. T. K. CROSSLAND 2,032,473
BRAKE
Filed Aug. 3, 1934  2 Sheets-Sheet 1
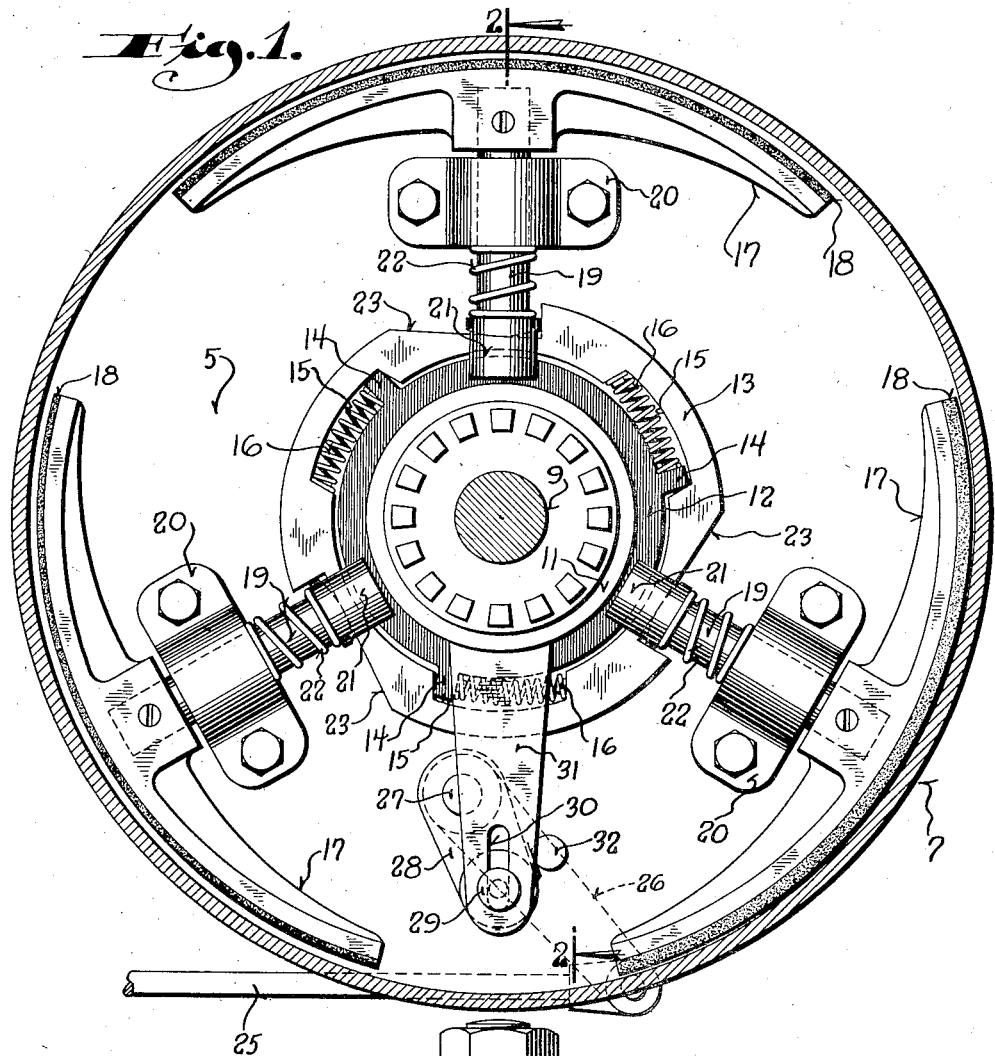

March 3, 1936.  T. K. CROSSLAND  2,032,473
BRAKE
Filed Aug. 3, 1934  2 Sheets-Sheet 2

Inventor
Theodore K. Crossland
By
Worsey

Patented Mar. 3, 1936

2,032,473

UNITED STATES PATENT OFFICE 2,032,473

BRAKE

Theodore K. Crossland, Milwaukee, Wis., assignor to William H. Crossland and Elizabeth Crossland, both of Milwaukee, Wis.

Application August 3, 1934, Serial No. 738,252

7 Claims. (Cl. 188—78)

This invention relates to brakes and refers more particularly to multiple shoe internal expanding brakes.

It is an object of this invention to provide a multiple shoe internal expanding brake wherein the braking effect of the several shoes is automatically equalized.

Another object of this invention is to provide a multiple shoe internal expanding brake which is so constructed as to obviate adjustment.

More specifically, it is an object of this invention to provide novel means for expanding a plurality of brake shoes into braking positions, wherein the pressure applied to all of the shoes is at all times equal regardless of differences in the amount of wear on the brake linings of the several shoes.

Another object of this invention is to provide a brake which has great braking power and which is so constructed that maximum braking effect may be obtained instantaneously or gradually without chattering or grabbing.

Another object of this invention is to provide a brake of the character described in which the brake shoes are releasable by a very slight pressure even though the brake has been set to apply its maximum braking effort.

A further object of this invention is to simplify the construction of internal expanding multiple shoe brakes and to afford a more rugged construction.

With the above and other objects in view which will appear as the description proceeds, this invention resides in the novel construction, combination and arrangement of parts substantially as hereinafter described and more particularly defined by the appended claims, it being understood that such changes in the precise embodiment of the hereindisclosed invention may be made as come within the scope of the claims.

The accompanying drawings illustrate one complete example of the physical embodiment of the invention constructed according to the best mode so far devised for the practical application of the principles thereof, and in which:

Figure 1 is a plan view of a brake embodying this invention, said view showing the brake drum and axle in cross section on the plane of the line 1—1 in Figure 2;

Figure 2 is a transverse section view through the brake taken on the plane of the line 2—2 of Figure 1.

Figure 3:
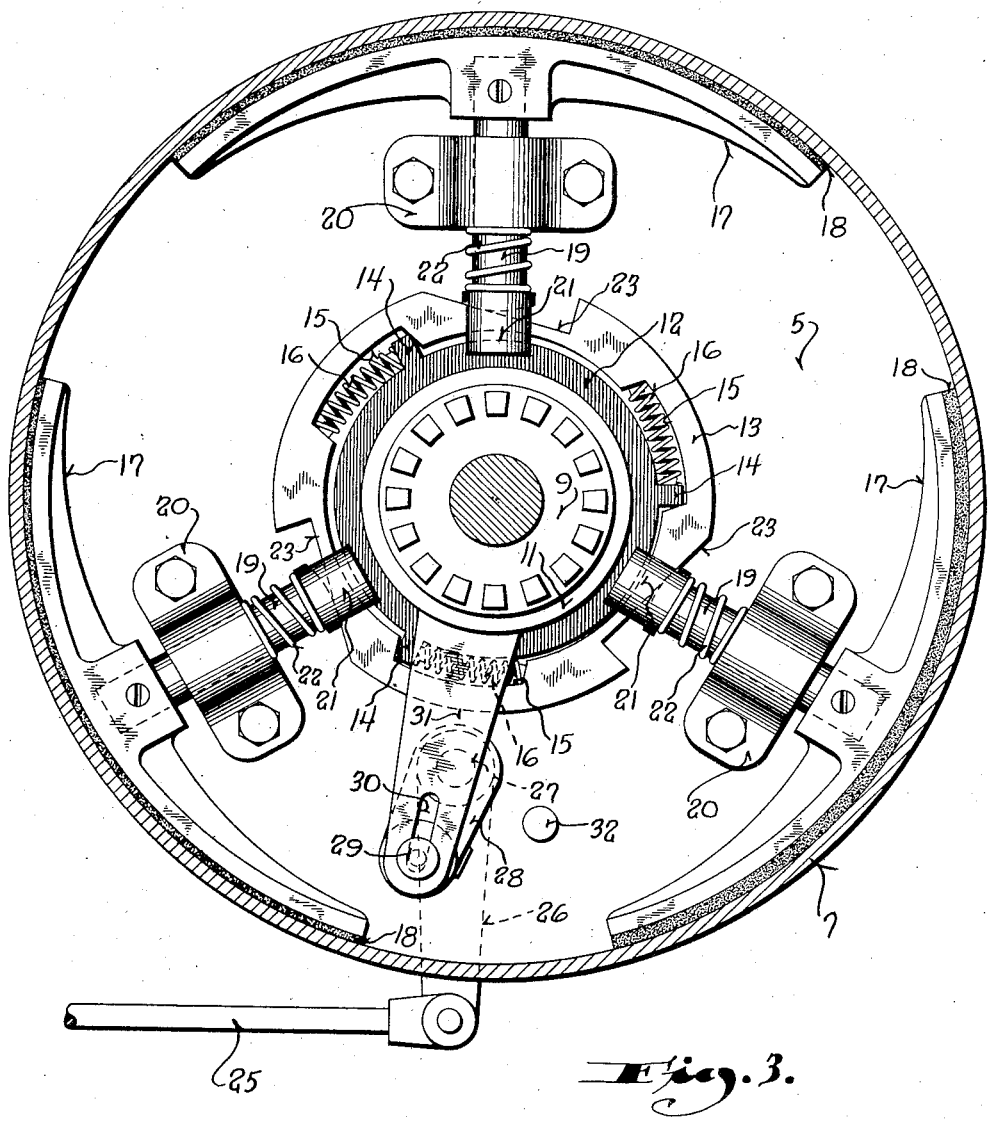
Figure 3 is a view similar to Figure 1, but illustrating the brake set.

Referring now more particularly to the accompanying drawings in which like numerals indicate like parts throughout the several views, the numeral 5 designates a stationary cylindrical plate which forms part of the axle housing 6, and on which the brake mechanism is mounted.

This stationary disc or plate 5 is of a size to close the open face of a brake drum 7 fixed to the spokes 8 of the wheel, the hub of which is fixed to an axle shaft 9 journalled in a bearing 10 in the outer end of the axle housing adjacent the stationary disc or plate 5. The bearing 10 is disposed within a cylindrical flange 11 formed as an integral part of the fixed plate 5 and extending outwardly therefrom toward the bottom of the brake drum.

Journalled on the outside of the flange 11 is a rotatable cam driver 12 which is arranged to rotate a floating cam 13 encircling the driver with sufficient clearance therebetween to permit the cam to shift into eccentricity with respect to the major axis of the brake. To impart rotation from the cam driver 12 to the cam 13, a plurality of lugs 14 integral with the driver extend radially therefrom into recesses or notches 15 in the inner periphery of the cam.

One end of each recess or notch 15 engages the adjacent radial lug 14, and to maintain this driving engagement between the lugs and the ends of the recesses 15 expansive springs 16 are confined between the opposite faces of the lugs and the other ends of the recesses.

Rotation of the cam 13 expands a plurality of brake shoes 17 into braking engagement with the inside of the brake drum.

The brake shoes 17, as is customary, have a brake lining 18 on their outer faces and are fixed to shafts 19 mounted for radial movement in bearings 20 secured to the stationary disc or plate 5. The inner ends of the shafts 19 are enlarged and stepped and have overhanging portions 21 extending over the cam and cam driver to hold these elements on the flange 11.

Expansive springs 22 confined between the enlarged stepped portions at the inner ends of the shafts 19 and the adjacent ends of the bearings 20 yieldably urge the brake shoes inwardly and out of braking engagement with the inside of the brake drum.

The stepped portions at the inner ends of the shafts 19 are curved as shown and engage inclined faces 23 on the cam provided by substantially right angular recesses in its outer periphery. Consequently, as the cam is turned in a clockwise direction (with respect to Figures 1 and 3), all of the brake shoes will be pushed outwardly by the action of the inclined faces 23.

Rotation is imparted to the cam driver 12 either from the depression of the usual brake pedal, not shown, or any other source of motive power under control of the operator, which force is applied to a brake rod 25 adapted to pull on a lever 26 fixed to a stud 27 journalled in a bearing on the disc or plate 5.

The inner end of the stud 27 has a second lever 28 fixed thereto, the outer end of which carries a pin 29. The pin 29 extends into an elongated slot 30 in an arm 31 fixed to and extending radially from the cam driver 12.

A stop 32 with which the lever 28 engages, defines the normal released position of the cam driver from which position the arm swings to the left upon the application of a pull on the brake rod 25 to turn the driver and consequently the cam in a clockwise direction.

As noted hereinbefore, there is substantial clearance between the cam driver and the rotatable cam so that the cam is substantially floatingly mounted. Hence, any variations in the distance the individual brake shoes must travel in a radial direction to effect their braking action is automatically compensated for and the braking pressure applied to all of the shoes is equalized.

To illustrate this feature of the invention, the brake shoes are shown with three different thicknesses of brake lining, a condition which might occur during use by reason of uneven wearing of the lining.

As illustrated in Figure 3, this condition of uneven brake lining thickness, is readily compensated for by the floating mounting of the cam. As here shown, the shoe having the lining of maximum thickness engages the inside of the brake drum first. Rotation of the cam after the engagement of the first brake shoe with the brake drum causes the cam to shift bodily away from the shoe already engaged to a position eccentric to the axis of the wheel at which the pressure applied on all of the shoes is equal.

Continued rotation of the cam will then impart equal braking pressure on all of the shoes as will be readily apparent.

Upon return of the cam driver to its normal position of rotation shown in Figure 1, the springs 16 cause the cam to follow the driver and the individual brake shoe springs 22 retract the shoes out of braking engagement with the drum.

From the foregoing description taken in connection with the accompanying drawings, it will be readily apparent to those skilled in the art, that this invention affords an exceptionally free acting brake in which equalized braking action on all of the shoes is attained at all times, and which need never be adjusted as unevenness in wear on the brake lining is automatically compensated for.

What I claim as my invention is:

1. In a brake, a rotatable brake drum, a plurality of radially movable brake shoes arranged to engage the inside of the drum, a rotatable driver mounted to turn about the axis of the brake, means to turn said driver, a rotatable cam loosely encircling the driver and adapted upon rotation to impart outward radial force on all of the brake shoes, and means between the driver and said rotatable cam providing a substantially floating nonrotatable driving connection from the driver to the cam whereby rotation may be imparted to the cam while at the same time the cam is free to shift with respect to the axis of the brake to compensate for variations in wear on the brake shoes and insure the application of equal braking force on all of the shoes.

2. In a brake, a rotatable brake drum, a plurality of radially movable brake shoes arranged to engage the inner face of the drum, a cam driver journalled for rotation about the axis of the drum, means to turn said driver, a rotatable cam loosely encircling the driver, a floating driving connection between the driver and the cam whereby rotation is imparted to the cam from the driver while at the same time the cam is free to shift into eccentricity with respect to the driver, and cam connections between the rotatable cam and the brake shoes whereby rotation of the cam imparts outward force to the brake shoes, the free floating mounting of the cam insuring the application of equal force on all of the brake shoes.

3. In a brake, a rotatable brake drum, a plurality of radially movable brake shoes arranged to engage the inner side of the brake drum, a fixed flange coaxial with the brake drum, a driver member mounted to turn on said flange, a rotatable cam member encircling the driver member with sufficient clearance to allow the cam member to shift into eccentricity with respect thereto, driving lugs on one of said members engageable in recesses in the other member to afford a substantially floating driving connection between the driver member and the cam member, and cam connections between the cam member and the brake shoes whereby rotation of the cam member imparts outward radial force to the brake shoes, said cam member shifting automatically to apply equal force to all of the shoes.

4. In a brake, a rotatable brake drum, a plurality of radially movable brake shoes arranged to engage the inner side of the brake drum, a fixed flange coaxial with the brake drum, a driver member mounted to turn on said flange, a rotatable cam member encircling the driver member with sufficient clearance to allow the cam member to shift into eccentriicity with respect thereto, driving lugs on one of said members engageable in recesses in the other member to afford a substantially floating driving connection between the driver member and the cam member, and cam connections between the cam member and the brake shoes whereby rotation of the cam member imparts outwardly radial force to the brake shoes, said cam member shifting automatically to apply equal force to all of the shoes, and spring means to return the brake shoes and cam member to their normal brake released positions.

5. In a brake of the character described, a rotatable brake drum, a stationary plate closing the open side of the brake drum, a plurality of brake shoes within the brake drum, bearings on said stationary plate mounting the brake shoes for radial movement to and from braking engagement with the inside of the brake drum, a cylindrical flange on the stationary plate coaxial with the brake drum, a floating rotatable cam encircling the flange and operable to expand the brake shoes radially and outwardly into operative braking engagement with the brake drum, said cam being free to shift into positions of eccentricity with respect to the flange to insure the application of equal force on all of the brake shoes, and a cam driver mounted to turn on said flange and having a substantially floating driving connection with the cam to impart rotation thereto without impairing the freedom of the cam to shift to any position necessary to apply equal force on all of the brake shoes.

6. In a brake, a plurality of radially movable brake shoes, a rotatable cam disposed centrally within the brake shoes, a rotatable driver inside the cam, a floating driving connection between the driver and cam whereby rotation may be imparted from the driver to the cam while at the same time the cam is free to shift into eccentricity with respect to the driver, and means providing the sole and proximate support for the brake shoes and for imparting outward motion generated by the cam to the brake shoes and for maintaining the cam in proper assembled relationship with respect to its driver.

7. In a brake, a rotatable drum, a stationary support covering the open side of the drum, a plurality of brake shoes movable radially to engage the inner periphery of the drum, a mounting shaft for each brake shoe, bearings carried by said stationary support in which said shafts slide and whereby the brake shoes are mounted on the stationary support, a driver rotatable about the axis of the brake, a cam loosely encircling the driver, a floating driving connection between the driver and cam whereby rotation may be imparted to the cam while at the same time the cam is free to shift into eccentricity with respect to the axis of the brake, means on said shafts engageable by the cam so that outward radial motion generated by the cam may be imparted to the brake shoes through said shafts, and means on said shafts cooperating with the stationary support to maintain the cam properly assembled with the rotatable driver.

THEODORE K. CROSSLAND.